Jan. 20, 1970 R. GAGNIER 3,491,212
LINE CIRCUIT AND PRIORITY ALLOCATING SYSTEM
Filed Oct. 3, 1966
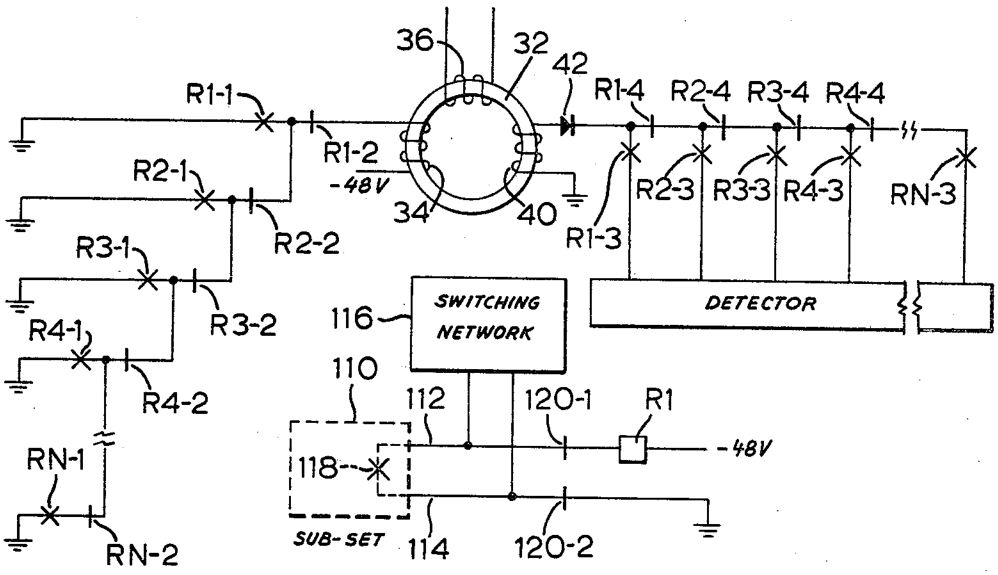
INVENTOR.
REAL GAGNIER
BY Westell & Hanley United States Patent Office 3,491,212
Patented Jan. 20, 1970

3,491,212
LINE CIRCUIT AND PRIORITY ALLOCATING SYSTEM

Real Gagnier, Hull, Quebec, Canada, assignor to Northern Electric Company Limited, Montreal, Quebec, Canada Filed Oct. 3, 1966, Ser. No. 583,563
Int. Cl. H04m 3/42
U.S. Cl. 179—18 13 Claims

ABSTRACT OF THE DISCLOSURE

A change of state in a telephone sub-set line causes (a) a relay to change the state of a circuit and then reverse the change or (b) mechanical movement and as a result of (a) or (b) the production of a pulse to "SET" a destructive read-out memory element. Circuitry is provided allowing the connection of a plurality of sub-sets to a single memory element for operation of the latter in accord with a system having a predetermined order of priority, and such system has more general application for determining priority among a plurality of requests for performance of an operation or operations.

This invention relates to means and a method for detecting a change of state in an electrical line and for determining priorities between the intended operations signalled by such change of state, and the invention is thought to have principal importance in the field of telephone line switching.

By "line" herein I refer to either a single wire, or pair of wires whichever in the circumstances, is used.

By "change of state" of a line herein I mean a change in the potential on or a change between current conduction and non-conduction in said line, and by "change of current state" is meant the latter type of change of state.

The invention provides means, quiescent while the line is in one state but actuable by the existence of the other state, to provide mechanical movement; means utilizing such mechanical movement to produce an electric pulse (preferably by the closing rapidly followed by the opening of a circuit); means using such pulse to "SET" a destructive read out memory element; and means for periodically scanning said element, designed and constructed so that when said element is scanned in its "SET" state, a detectable signal is produced, and said element is switched back to the "RESET" state.

While the most probable destructive read-out memory element will be a ferrite core, it should be realized that any other destructive read out memory element may be used, connected to be "SET" by the pulse, to be scanned and read out in manners well known to those skilled in the art but characteristic of the memory element used. As examples only, it will be noted that magnetic tape or thin film destructive read-out memories could be used although these are not believed to be as practical in most applications as ferrite cores.

By "RESET" as an adjective is meant the quiescent state of the memory element and as a verb the transition to such quiescent state. By "SET" as an adjective we mean the other state of memory element and as a verb, the transition to said other state.

The preferred application of the invention is to telephone circuitry, wherein the fact that it is desired to connect or to switch the connections of a sub-set is signalled by a change of state of the sub-set line.

In the discussion relative to the telephone art the following terms will be used:

A call is "initiated" when a telephone communication equipment hereinafter called a "sub-set" is operated (usually by lifting the hand-set) resulting in one operation changing the corresponding line state usually by closing a hook switch and resulting in a change of current conduction and/or of potential in the sub-set line.

A call is "completed" when the switching connections are made so that conversation may commence or when a predetermined part of such switching has been performed.

A call is "terminated" when the handset is replaced after the end of the conversation.

At the present time the need for connection or switching of such sub-set line where a call has been initiated but not yet completed is detected by signalling such initiation by causing the presence of a predetermined state in the sub-set line and by having a relay or equivalent device operated by the existence of such state, which relay hence reflects the potential or conductivity state of the sub-set line. A plurality of such sub-set lines are then periodically scanned and the line which caused the operation of the relay or equivalent device is detected, and responsive to such detection the necessary switching operations are initiated. However, with prior devices it is necessary to take into account that although the first "scan" after the operation of the relay has detected the line for which switching is required, the second scan will, since the state of the line has not changed, tend to cause a repetition of the first detection with confusion and unnecessary circuit operation. On the other hand, the line state indicating relay cannot conveniently be discontinued on detection by the first "scan" since this will usually occur before the necessary switching has taken place, i.e. before the "completion" of the call and undesirable clicks would be caused in the hand-set line by disconnection. Previously therefore, on detection of line state (where a call had been initiated) by the first scan, the known methods would avoid the problem of subsequent redetections in one of three ways:

(1) By stopping the scanner.

(2) By comparing state of sub-set line at present scan, with state of sub-set line at previous scan, and initiating the service only if a change in consecutive scans in the sense corresponding to initiation of a call is noted.

(3) Each scan re-detects previously detected sub-set lines. However, all detections are compared with lines then being served and only those which do not correspond to lines being served are processed.

To solve the problem in any one of the above three ways requires special control logic in the sense of extra equipment or programming, adding greatly to equipment complexity and cost.

This invention provides means which avoids the disadvantages just mentioned without requiring the addition of special control logic.

The invention provides means for causing, as a result of a change of state of the sub-set line, a relay operation. Means are provided to cause the relay to preferably connect, then disconnect, a circuit, but in any event to change the state of a circuit, and then reverse the change, within a short time. Means are provided for producing, as a result of such change and re-change, a pulse, and means are also provided for using such pulse to "SET" a destructive read-out core.

The invention also comprises a method of using the change of state in the sub-set line to produce mechanical movement, using said mechanical movement to produce a pulse, recording said pulse on a destructive read out memory, detecting said record and obliterating said record.

Although the invention as so far described, is suitable for use where a destructive read-out element corresponds to each sub-set line, the disclosure herein shows circuitry whereby a plurality of sub-sets may be connected to a single destructive read-out memory element.

It will be seen that the invention also has application outside the telephone art where the signals respectively indicative of the requests of each of a plurality of devices to have respective operations performed, are caused to respectively operate corresponding relays to signal the need for such operation, and wherein such operations are assigned priorities effective, in accord with the circuitry described, to determine the relative order in which such requested operations are performed.

The drawings illustrate circuitry in accord with the invention.

In the drawings: a sub-set or subscriber's set 110 is shown connected to wires 112 and 114 which connect the sub-set to a switching network 116 for connection to other sub-sets.

Since the bulk of the wiring and mechanism in the sub-set and in the switching network is of no interest to the description of this invention, this is in substance omitted and it is merely indicated schematically that, in the sub-set, a switch 118 commonly called a "hook-switch" is closeable to connect lines 112 and 114. The switch 118 is arranged so that on the initiation of action at the sub-set for completing a call (usually by lifting the hand set) the switch 118 is closed and is later opened by the replacement of the receiver.

The line 114 in addition to being connected between the sub-set and the switching network is connected to ground through the normally closed contacts 120–2 of a cut off relay which is not shown, but which is discussed hereinafter.

Line 112 in addition to connection between the sub-set and the central switching network, is connected to a potential source (here) 48 volts through the normally closed contacts 120–1 of the cut-off relay and a relay R1.

There is provided a memory element 32 of the destructive read-out type, preferably a ferrite core, and having a "SET," "scan" pulse input and a "sense" winding. Although these windings are referred to separately because of their separate functions, it is considered within the scope of such terminology both of the disclosure and the claims to perform one or more of the indicated functions in the same winding, where the design allows this.

It will be understood that the design of such ferrite core will be related to the design of the detection means so that unwanted impulses on the sense winding 40 are of much less value than impulses which it is desired to detect and hence the detector may easily be designed to ignore the former and detect the latter. The impulses on sense winding 40 due to scan pulses when core 32 is in "RESET" will therefore be small in magnitude to be ignored by the detector. A rectifier 42 is included between the sense winding and the detector, to prevent the application to the detector of a pulse resulting from the change of state from "RESET" to "SET."

The detection circuitry will therefore be designed to ignore pulses other than the large pulse which will occur on winding 40 when the core is "RESET" by the incidence of a scanning pulse.

Many cores are operable in accord with the above criteria. One which has been used in this way is the type TMS06–15 ferrite memory core produced by Telemeter Magnetics Inc., 2245 Pontius Ave., Los Angeles 64, Calif. With this core the set winding circuit will be designed to provide 350 ma./turns and the scan pulse input winding circuit 350 ma./turns of the opposite polarity. With such arrangement the output as a result of a scan pulse is about 5 millivolts with the core previously at "RESET" and about 55 millivolts with the core previously at "SET."

The "SET" winding 34 is connected at one end of a D.C. source (here) 48 volts and at the other end to ground through first the normally open and then the normally closed contacts R1–1 and R1–2.

The contacts R1–1 and R1–2 and the other "R1" contacts later mentioned correspond to the relay R1 which in turn corresponds to the sub-set 110. Although the invention is useful and operable where the memory element is uniquely identified with a single sub-set, there is herein described a circuit wherein a number of sub-sets are used with the same memory element. Each of these sub-sets will be similar in construction and connection to the one shown and hence will have leads similar to leads 112 and 114, contacts similar to 120–1, –2, a relay corresponding to R1 (referred to respectively as relays R2, R3–RN herein) and will be connected to switching network 116 or a similar network. Such sub-sets are not shown because they would be mere duplicates of those displayed, but the contacts of the relays are shown, those corresponding to the second and third sub-sets starting respectively with the designations "R2–" and "R3–" and so on up to "RN–" for the Nth sub-set.

The junction between the normally closed and normally open contacts R1–1 and R1–2 is connected to ground through first the normally closed and then the normally open contacts R2–2 and R2–1 of a relay R2.

The junction between contacts R2–1 and R2–2 is connected through closed and open contacts of the R3 relay in a similar manner and this will be repeated to include the number of such series of closed and open contacts –1 and –2 which are equal to the number of sub-sets which are to be handled by the core 32.

The scan pulse input winding 36 is connected to a scan source of well-known construction, not shown, adapted to supply periodic scanning pulses.

The sense winding 40 is connected at one end to ground and at the other end to a rectifier 42 poled to pass the pulse resulting from the change of state of the core to "RESET" but to block the pulse of the opposite sense resulting from the change of state of the core to "SET."

The rectifier 42 on the other end from that connected to the winding 40 is connected through normally closed contacts –4 in series, starting from the rectifier, of relays R1, R2 up to R(N minus 1) (no —4 contact being required for relay RN).

The connection between the rectifier 42 and contacts R1–4 is connectable to a part of a detector circuit peculiar to sub-set 1 through normally open contacts R1–3 and so on, with each connection betwen a pair of sequentially numbered normally closed –4 contacts being connectable to a detection through normally open –3 contacts of the relay corresponding to the lower number of the sequentially numbered contacts. It will also be found on reference to the description, that the lower the number of the relay, the higher the priority assigned to the corresponding sub-set in connection with competing requests for switching, is provided for the sub-set with which the relay is associated.

For any "R" relay the normally open –1 contacts will be arranged to close before the –2 contacts open, the interval between closure of the –1 contacts and opening of the –2 contacts being chosen to correspond to a suitable pulse length to "SET" core 32. The –3 and –4 contacts of an R relay will be selected to preferably both operate together at or later than the opening of the –2 contacts. This avoids the risk that the core will be "SET" and destructively read out before the –3 and –4 contacts have correctly routed the sense pulse. It will be noted therefore that re-operation of the –3 and –4 contacts preferably takes place at or before the closing of the –2 contacts. The latter condition is to ensure that the pulse resulting from release of the R1 relay does not cause sub-set 1 to be redetected.

It will be understood that the function and operation of the detector is well known to those skilled in the art and that on receipt of a pulse through any one of the –3 contacts, say R3–3, the line between such contacts and the detector is uniquely associated in the detector with the third sub-set and the detector will be designed and constructed to identify the request by the sub-set corresponding to relay R3 and to initiate the desired switching action for such sub-set.

It will also be understood that the detector may take many forms, all well known to those skilled in the art. It may be that a single detector will be used with all the sub-sets operated in conjunction with core 32, with means controlled by relays and the lines between the –3 contacts and the detector for identifying the sub-set. It may be that a single detector will be used, where, as shown, terminals associated with each of the sub-sets by the lines to the corresponding –3 contacts are sequentially poled. It may be that individual detectors will be provided for each relay, connected respectively to the normally open –3 contacts, on the side remote from the core 32. The choice of number and design of detectors and the method of identifying the sub-set from the line to which the –3 contacts are connected is well known to those skilled in the art. For the purposes of this application it should be sufficient to say that means are provided for identifying a pulse passing a set of –3 contacts with the sub-set corresponding to the relay having such contacts to indicate the requested switching action.

In operation, with none of the sub-sets associated with core 32 in operation, all hook-switches are open, the 120–1 and –2 contacts are closed as are the corresponding contacts on the corresponding relays, for the other sub-sets. All R relays are de-energized hence all relay contacts are in their normal state as shown. The core is in "RESET" and the scanner is supplying periodic scan pulses which do not produce outputs at the detector since all the –3 contacts are open but also because the detector will usually be designed to discriminate between the small pulse which appears on the sense winding due to a scan pulse unaccompanied by a change of state and the large pulse when a scan pulse switches the core from "SET" to "RESET."

Assume that sub-set 110 is operated by lifting the hand-set. The hook switch 118 closes and as the cut off relay contacts 120–1 and 120–2 are closed, lines 112 and 114 change from a non-conducting to a conducting state and relay R1 is energized. As a result, the relay R1 starts to operate first closing the contacts R1–1. As a result current flows from the —48 volt source through "SET" winding 34, contacts R1–2 and R1–1 to ground. Later by an interval corresponding to the desired pulse period, R1–2 opens, terminating the "pulse" formed in the interval between the closing of contacts R1–1 and the opening of contact R1–2. The pulse so formed "SETS" the core 32 and the resultant pulse created in sense winding 40 is blocked by rectifier 42. Contacts R1–3 close and R1–4 open at or after the opening of R1–2.

Since the core is now "SET" the next scan pulse will cause it to "RESET" and there will be produced a pulse on winding 40 of the correct sense to pass rectifier 42 with R1–3 closed and R1–4 being open, the "sense" signal pulse goes through contacts R1–3 down the first detector line where it identifies sub-set 1 as that requesting service. As a result of the "RESET" condition of core 32, scans after the one causing the "RESET" are ignored.

As a result of the detection of the need of sub-set 1 for switching, the switching will be performed by means not shown but well known to those skilled in the art and at the completion of this, or at a pre-determined stage herein defined as the completion of the call, relay 120 is operated, contacts 120–1 and 120–2 will open, relay R1 will be released closing contacts R1–2 and R1–4 and opening contacts R1–3 and later by the desired pulse interval opening contacts R1–1.

On the release of the R1 relay it will be noted that a pulse is sent to the "SET" winding by the closure of R1–2 before the opening of R1–1. This sets the core and the next scan pulse will result in a pulse from sense winding 40 through rectifier 42. However, due to the prior opening of contacts R1–3 the detector will not be repulsed on behalf of sub-set 1 although as hereinafter described it may be repulsed on behalf of another sub-set requesting switching at that time.

The above operations leave the circuit as shown and the detector has assumed that no other sub-set called for switching within the same scan interval of the operation of hook switch of sub-set 1. The operation would have been the same for the individual operation of any sub-set of lower priority than the first, although the "SET" pulse circuit would include the closed –2 contacts of any relay corresponding to a sub-set of higher priority and the sense circuit would include the closed –4 contacts of any relay corresponding to a sub-set of higher priority.

Suppose however that the second priority sub-set has been operated, causing the operation of relay R2 and the provision of a pulse due to the contemporaneous closure to contacts R2–1 and the opening of contacts R2–2, "SETTING" core 32.

However, suppose that in the interval before the occurrence of the next scan pulse, the first priority sub-set 1 is also operated. The resultant operation of relay R1 will open contacts R1–4 and close contacts R1–3. The pulse caused by the contemporaneous closure of contacts R1–2 and R1–1 will be of no effect since the core 32 is already "SET." However, when the first scan pulse occurs, the resultant sense pulse will go through the contacts R1–3 resulting in the switching of sub-set 1, nothing happening as far as sub-set 2 is concerned since although contacts R2–3 are closed, contacts R1–4 are open. However, when the switching of sub-set 1 has reached the predetermined stage the relay 120 is de-energized and the contacts R1–3 open, R1–4 close (preparing the sense circuit for the provision of a sense pulse through already closed contacts R2–3). At or after the opening of contacts R1–3, contacts R1–2 closes and thereafter R1–1 opens. The resultant pulse "SETS" core 32 a second time. The next scan pulse therefore creates a pulse on sense winding 40. R1–4 is now closed as is R2–3 while R1–3 is now open. Thus the detector detects the requirement of sub-set 2 for switching. When the switching is completed to the predetermined stage, the sub-set 2 relay corresponding to relay 120 is opened releasing relay R2 but the pulse thereby created does not affect the detector since although it is "SET" and "read out" of core 32 the sense pulse is ignored since R2–3 will be open before its occurrence.

If the operation of the sub-set 1 had preceded sub-set 2 then it will be seen that the core would be "SET" by the operation of the R1 relay. The operation of the R2 relay (responsive to a request by sub-set 2) would be ignored since the core would be then already "SET." Once the switching had been performed, for sub-set 1 the release of the R1 relay would "SET" the core for detection of the request of sub-set 2. The release of the R2 relay would cause a sense pulse but not a third detection since the R2–3 contact would have opened earlier.

In the manner described it will be seen that any combination of priorities of sub-stations may be simultaneously or at overlapping times requesting service. The first sub-set operated will "SET" the core, but the highest priority substation operated before the "SET" condition is detected will be the first switched. Thereafter the release of the highest priority R relay will set the core and at the next scan pulse the sub-station of next highest priority *then* requesting service is detected and switched and so on until all requests are served.

While the circuity whereby a number of devices may use a single memory element has been described in relation to a telephone switching system it will be noted that the circuitry described may be used for a number of devices of different sort and requiring operations other than switching, whereon the requests embodied in physically detectable form by a device for an operation, corresponding R relays are caused to operate resulting in the "SETTING" of a destructive read-out memory element, the detection of the highest priority device, the completion of its operation, the release of the corresponding R relay, again setting the core resulting in the detection of the next highest priority device requiring an operation—and so on. Thus the invention is not limited to operations for telephone sub-sets or to systems where the operation is switching.

I claim:

1. For use with telephone circuitry including sub-sets;
a relay;
connected to be operated when a sub-set is actuated to initiate a call;
a first set and a second set of contacts of said relay;
said first set of contacts being normally open and said second set of contacts being normally closed;
a destructive read out memory element designed to assume "SET" and "RESET" states having scan pulse input, "SET" and sense windings therein; and designed to produce a signal in said sense winding on switching of said element from "SET" to "RESET" states;
said relay being designed and constructed so that on operation, the closure of said normally open contacts occurs before the opening of said normally closed contacts;
a circuit connecting in series said two sets of contacts and said "SET" winding;
means for connecting said circuit across a source of potential, the interval of common closure of said first and second sets of contacts being selected so that with connection across such source said interval of common closure results in a pulse in such circuit which "SETS" said destructive read out memory element.

2. Means for initiating a request for a switching operation in connection with a telephone set associated with a telephone line connected and designed to assume a "ready" state when a call has been initiated but not completed on said line and an "off" state between termination of a call and initiation of the next call comprising:
a relay to be operated in one sense as a result of the change of state on said line from the "off" to the "ready" state, first and second sets of contacts on said relay;
said first set of contacts being normally open and said second set of contacts being normally closed;
said contacts being so designed and arranged that on said operation said normally open contacts close shortly before said normally closed contacts open;
circuit means connected to include said normally open and normally closed contacts connected in series, said circuit being energizable to assume one state when said sets of contacts are both closed and a different state at other times;
means connected to said circuit to produce a pulse corresponding to said first-mentioned state;
a destructive read out memory element adapted to assume "SET" and "RESET" states, having "SET," scan pulse input and sense windings;
means for utilizing said pulse to cause said "SET" winding to "SET" said core;
whereby upon the application of scan pulses to said scan pulse input winding said sense winding carries the information as to whether at the time of each said pulse, said core is in "SET" or "RESET" state;
and in the scanning of said core in the "SET" state, said core is switched from the "SET" to the "RESET" state.

3. A method of initiating a request for a switching operation in connection with a telephone line connected and designed to assume a conducting and a non-conducting state; comprising the steps of:
causing mechanical movement in response to said change of state from non-conducting to conducting;
utilizing said mechanical movement to change the state of an electrical line and shortly thereafter to reverse said change;
producing from the said change and reverse change, a pulse;
recording the presence of said pulse on a memory element;
periodically scanning said memory element and producing a signal as a result of the detection of said pulse;
and on such detection obliterating said record.

4. Means for indicating the request for a switching operation in connection with a telephone line connected and designed to assume a conducting and a non-conducting state comprising:
means responsive to a change from one state to the other state to create mechanical movement;
means for deriving from said mechanical movement, a pulse;
means for recording the existence of said pulse;
means for detecting the existence of said record;
means conditional on such detection, for obliterating said record.

5. Means for indicating the request for a switching operation for a telephone line connected and designed to assume an "off" state between termination of a call thereon and initiation of another call, and a "ready" state between initiation of a call and completion thereof, comprising:
a relay connected to be operated as a result of the change of potential on said line from the "off" to the "ready" state:
means for deriving from said relay operation, a pulse;
means for recording the existence of said pulse;
means for detecting the existence of said record;
means conditional on such detection, for obliterating said record.

6. For use with circuitry having a plurality of devices requiring an operation where said devices are allocated relative priorities:
a relay corresponding to each of such devices each such relay being connected to be operated when its corresponding device indicates a request for switching;
first and second sets of contacts of said relays, said first set of contacts being normally open and said second set of contacts being normally closed;
a destructive read out memory element having scan pulse input, "SET" and sense windings, each said relay being designed and constructed so that on operation or on release, an interval occurs when both said contacts are closed;
a circuit connecting each pair of said first and second contacts in series with each other, and with said "SET" winding, each said circuit including between said first and second sets of contacts on the one hand, and said "SET" winding on the other hand, the second set of contacts of relays corresponding to any such device of higher priority:
each such circuit being connectible across a source of potential;
the length of the interval when said first and second sets of contacts are both closed on operation or release of said relay being selected so that with connection across the selected source, said interval results in a pulse in such circuit which "SETS" said memory element;
means for providing a signal and resetting said memory element as a result of the incidence of a scan pulse on the memory element;
means responsive to such last mentioned signal and the closed or open condition of the contacts of said respective relays, for determining the highest priority device then requiring an operation;
means connectible to cause release of a previously operated relay when the required switching for its corresponding device has been performed;

means preventing detection resulting from the switching of said memory element to "SET".

7. A device as claimed in claim 6 wherein said means for determining the highest priority device comprises:

normally open third sets of contacts for each of said relays;

normally closed fourth sets of contacts for each of said relays except that relay corresponding to the device of lowest priority, each third set of relay contacts being connected between said sense winding and a line associated with the device corresponding to such relay, each third set of contacts being connected to such sense winding through the normally closed fourth sets of contacts of relays corresponding to devices of higher priority.

8. Means as claimed in claim 7 wherein each said third and fourth sets of contacts are arranged to operate with or after the corresponding second set of contacts and to release with or before the corresponding second set of contacts.

9. Means for initiating requests for switching by telephone hook switches which are assigned relative priorities, where each hook switch is connected to a line, where such line is connected and designed to assume a "ready" state when a call has been initiated but not completed on said line and an "off" state between completion of a call and the initiation of the next call on said line, comprising:

a relay corresponding to each hook switch connected to be operated as a result of the change of state on said line from the "off" to the "ready" state and to be released on the completion of a call for each line comprising;

first and second sets of contacts on said relay;

said first set of contacts being normally open and said second set of contacts being normally closed;

said contacts being designed and arranged so that during operation or release, said first and second contacts are both closed for a short interval;

a destructive read out memory element designed to assume "SET" and "RESET" states, having "SET," scan pulse input and sense windings, and designed to produce in said sense winding a pulse on switching from "SET" to "RESET" state;

circuits corresponding to each such hook switch wired to include the first and second sets of contacts of the corresponding relay connected in series, and connectible to said "SET" winding through the second set of contacts of relays corresponding to hook switches of higher priority;

each said circuit being connectible to energizing means arranged to produce a pulse during the time the first and second sets of contacts peculiar to said circuit and the second sets of contacts corresponding to hook switches of higher priority are all closed;

said circuitry and contacts being arranged so that each pulse sets said memory element whereby upon the application of scan pulses to said scan pulse input winding with the memory element "SET" said element "RESETS" and said sense winding carries a pulse; means responsive to the existence of such pulse and to the state of said relays for determining the highest priority hook switch then requiring switching;

said last mentioned means being connectible to means for causing said switching.

10. A device as claimed in claim 9 wherein said means for determining the highest priority hook switch comprises;

third sets of normally open contacts for each of said relays;

fourth sets of normally closed contacts for each of said relays except that corresponding to the hook switch of lowest priority;

each third set of relay contacts other than those of the relay corresponding to the hook switch of highest priority being connected to such sense winding through the normally closed fourth sets of contacts of relays corresponding to hook switches of higher priority.

11. Means as claimed in claim 10 wherein said third and fourth sets of contacts are arranged to operate with or after said second set of contacts and to release with or before said second set of contacts.

12. A method of handling a request for an operation by a device having physically detectable means to signal the request for such operation comprising:

causing mechanical movement in response to the request of such device for such operation;

utilizing said mechanical movement to change the state of an electrical line and shortly after to reverse said change;

producing from said change and reverse change, a pulse;

recording the presence of said pulse on a memory element;

periodically scanning said memory element and producing a signal as a result of the detection of said pulse;

and at said detection obliterating said record.

13. Means for indicating the request for an operation in relation to a device having physically detectable means to signal the request for such operation, comprising:

means responsive to operation of said initiating means to create mechanical movement;

means for deriving from mechanical movement a pulse;

means for recording the existence of said pulse;

means for detecting the existence of said record; and means conditional on such detection for obliterating said record.

References Cited

UNITED STATES PATENTS

| | | | |
|---|---|---|---|
| 3,190,964 | 6/1965 | Trueman et al. | 179—18 |
| 3,192,323 | 6/1965 | Hersey | 179—84 |
| 3,290,657 | 12/1966 | Riddell | 179—18 |

KATHLEEN H. CLAFFY, Primary Examiner

THOMAS W. BROWN, Assistant Examiner

U.S. Cl. X.R.

179—84